(12) United States Patent
Kovasity et al.

(10) Patent No.: US 8,677,728 B2
(45) Date of Patent: Mar. 25, 2014

(54) TURBINE MACHINE

(75) Inventors: Joseph J. Kovasity, Grand Blanc, MI (US); Vern E. Brooks, Ortonville, MI (US)

(73) Assignee: Technical Directions, Inc, Ortonville, MI (US)

( * ) Notice: Subject to any disclaimer, the term of this patent is extended or adjusted under 35 U.S.C. 154(b) by 2102 days.

(21) Appl. No.: 10/793,065

(22) Filed: Mar. 4, 2004

(65) Prior Publication Data

US 2005/0193713 A1    Sep. 8, 2005

(51) Int. Cl.
*F01D 11/14*    (2006.01)

(52) U.S. Cl.
USPC ............ 60/39.08; 60/745; 60/802; 415/173.2

(58) Field of Classification Search
USPC ................ 60/39.08, 796, 745, 349, 730, 802; 415/214.1, 173.2; 290/52
See application file for complete search history.

(56) References Cited

U.S. PATENT DOCUMENTS

| | | | | |
|---|---|---|---|---|
| 2,685,421 A * | 8/1954 | Klose | ............................... | 244/74 |
| 3,204,406 A * | 9/1965 | Howes et al. | ................. | 60/39.17 |
| 4,543,781 A * | 10/1985 | Rice | ................................. | 60/804 |
| 4,697,238 A * | 9/1987 | Barbeau | ........................ | 701/100 |
| 4,769,993 A * | 9/1988 | Kawamura | ....................... | 60/597 |
| 4,819,438 A * | 4/1989 | Schultz | ............................ | 60/730 |
| 4,852,355 A * | 8/1989 | Kenworthy et al. | ............. | 60/751 |
| 5,098,133 A * | 3/1992 | Glover | ............................. | 285/23 |
| 5,526,640 A | 6/1996 | Brooks | | |
| 5,828,137 A * | 10/1998 | Selfors et al. | .................... | 290/52 |
| 6,263,664 B1 * | 7/2001 | Tanigawa et al. | ............. | 60/39.54 |
| 6,735,949 B1 * | 5/2004 | Haynes et al. | ................... | 60/746 |
| 2004/0255597 A1 * | 12/2004 | Glessner et al. | ................ | 60/796 |

* cited by examiner

*Primary Examiner* — Andrew Nguyen
(74) *Attorney, Agent, or Firm* — Paul S. Rulon

(57) ABSTRACT

A gas turbine engine (10) comprises a diffuser (14) and a nozzle (16) affixed to an annular housing (12), a bearing assembly including first and second bearings (24,26) mounted on a support tube (28) affixed at one end (28*a*) in cantilever fashion to a radially inner portion (16*c*) of the nozzle, a compressor (18) and a turbine (20) affixed to axially spaced apart ends of a shaft (22) rotatably mounted in the bearings, and an annular combustor (32) disposed between the compressor and turbine and concentric to the shaft. The diffuser is adjustably attached to the housing external threads (14*e*) on an outer annular surface of the diffuser and received in internal threads (12*e*) in an internal annular surface of the housing. An electric generator (42) is disposed radially inward of the annular combustor axially between the diffuser and nozzle. A fuel slinger (30), affixed to the shaft, receives fuel from an air/fuel annulus (88) defined by a stator (44) and a rotor (46) of the generator. An air/fuel mixture in the annulus also lubricates and cools the bearings, and cools the stator and a hub portion (20*a*) of the turbine. A fuel/air connector assembly (38) connects the engine to a source of metered fuel (39) and connects compressor discharge air to a fuel reservoir (43).

22 Claims, 2 Drawing Sheets

TURBINE MACHINE

FIELD OF THE INVENTION

This invention relates to a turbine machine.

BACKGROUND OF THE INVENTION

Many prior art patents purport to disclose small gas turbine engines with reduced manufacturing and assembly costs and with improved function. These patents are generally concerned with structural and functional improvements of downsized large engines. Unfortunately, large gas turbine engines have not readily scaled down in effective cost thrust proportional bases. The engine disclosed herein is related to the small gas turbine engine in U.S. Pat. No. 5,526,640 and is incorporated herein by reference. The engine herein is improved by reducing manufacturing and assembly cost. The engine herein is combined with an electric generator without increasing the overall size of the engine-generator combination.

SUMMARY OF THE INVENTION

An object of this invention is to provide a low cost turbine engine.

Another object of this invention is to provide an engine that is easy to assemble.

Another object of this invention is to provide an engine-generator combination that is compact and easy to install with other components.

According to feature of the invention, a turbine machine comprises a housing having an annular surface and a shaft having an axis. A bearing assembly (24,26) mounts the shaft for rotation and non-axial movement in the housing about the axis. Annular impeller means includes a body portion concentrically affixed to the shaft and a plurality circumferentially spaced apart fluid working blades extending from the body. The blades have curvilinear shaped free ends extending between fluid inlet and outlet ends of the blades. A flow directing means directs the fluid associated with one of the blade ends and has an annular surface. An attachment assembly affixes the flow directing means to the housing.

The improvement comprises the attachment assembly including screw threads on the housing annular surface and mating with screw threads on the flow directing means annular surface for adjustably affixing the flow directing means to the housing.

According to another feature of the invention, a gas turbine engine comprises an annular housing means and a shaft having an axis. A bearing assembly mounts the shaft for rotation and non-axial movement in the housing about the axis. An annular combustor is disposed in the housing means concentric to the shaft. An impeller means includes an annular body portion concentrically affixed to the shaft and a plurality circumferentially spaced apart fluid working blades extending from the body portion. The blades have curvilinear shaped free ends extending between inlet ends and outlet ends of the blades. A flow directing means directs the fluid between the impeller and the combustor. A shroud means includes an inner surface having a curvilinear shaped surface in closely spaced sealing relation with and matching the curvilinear shaped free ends of the blades. A first attachment assembly affixes the flow directing means to the housing means. A second attachment assembly affixes the shroud to the flow directing means.

The improvement according to the above feature comprises one of the attachment assemblies including internal screw threads on a radially inwardly facing annular surface of one of the means and mating with external screw threads on a radially outwardly facing annular surface of another of the means for clearance adjusting the spaced sealing relation between the blade curvilinear shaped free ends and matching shroud curvilinear shaped surface by moving the threads relative to each other.

According to another feature of the invention, a gas turbine engine comprises an annular housing and a shaft having an axis. A bearing assembly mounts the shaft for rotation and non-axial movement in the housing about the axis. An annular combustor is disposed in the annular housing means concentric to the shaft. A compressor is affixed to the shaft. A diffuser directs air from the compressor to the annular combustor. A turbine nozzle is axially spaced from the diffuser with the combustor axially disposed there-between. A turbine is affixed to the shaft and axially spaced from the compressor.

The improvement according to the above feature comprises an electric generator having a stator mounted axially between the diffuser and the nozzle, radially inward of the annular combustor and concentric to the shaft, and a rotor affixed to the shaft radially inward of the stator.

BRIEF DESCRIPTION OF THE DRAWINGS

A turbine engine according to the invention is shown in the accompanying drawings in which;

FIG. 3 is sectioned part of the engine of FIG. 1 schematically shows sources of fuel and of metered fuel.

DETAILED DESCRIPTION OF THE DRAWINGS

Figure 1:
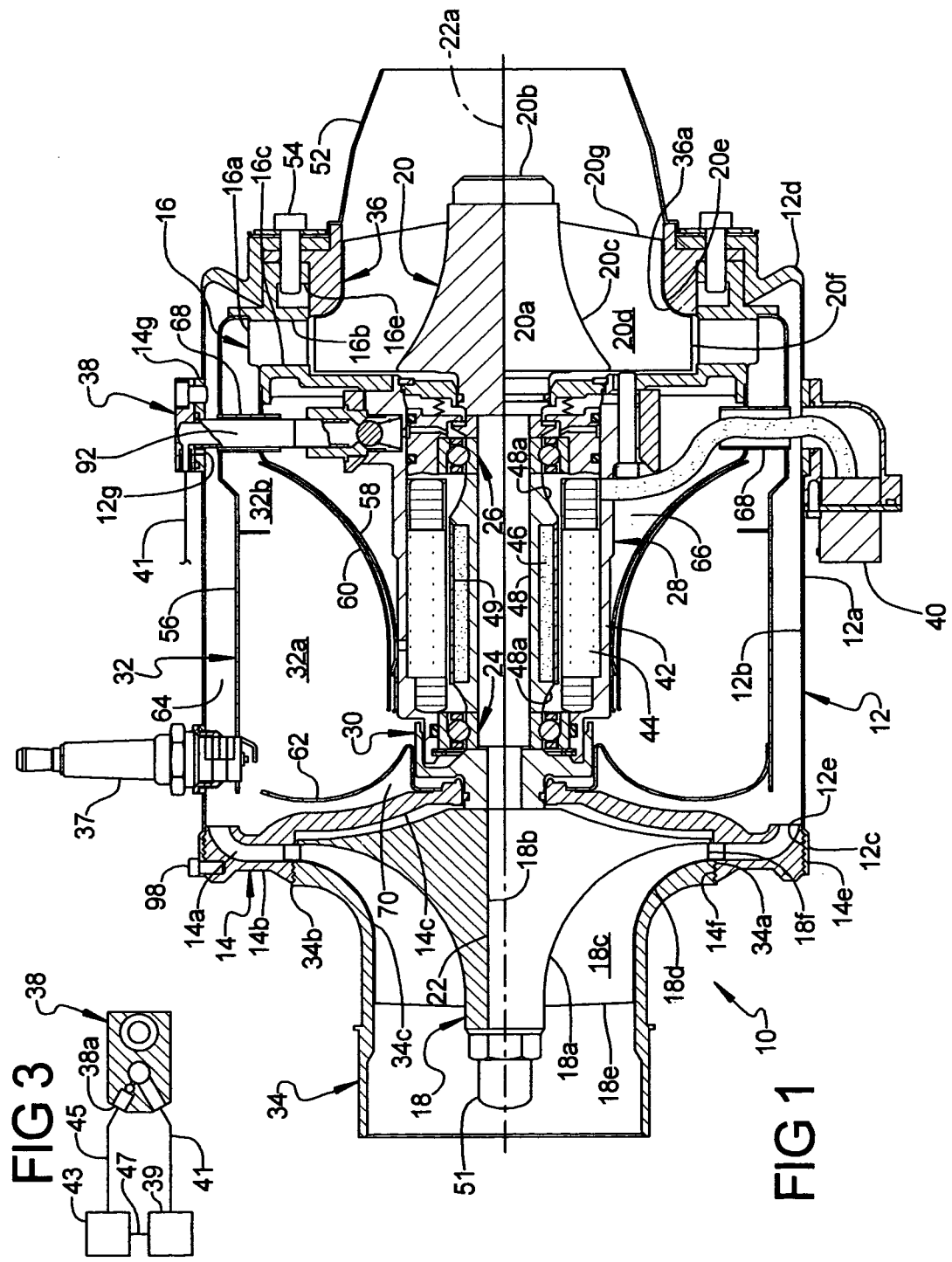
FIG. 1 is a cross-sectional view of the engine according to the invention.
Figure 2:
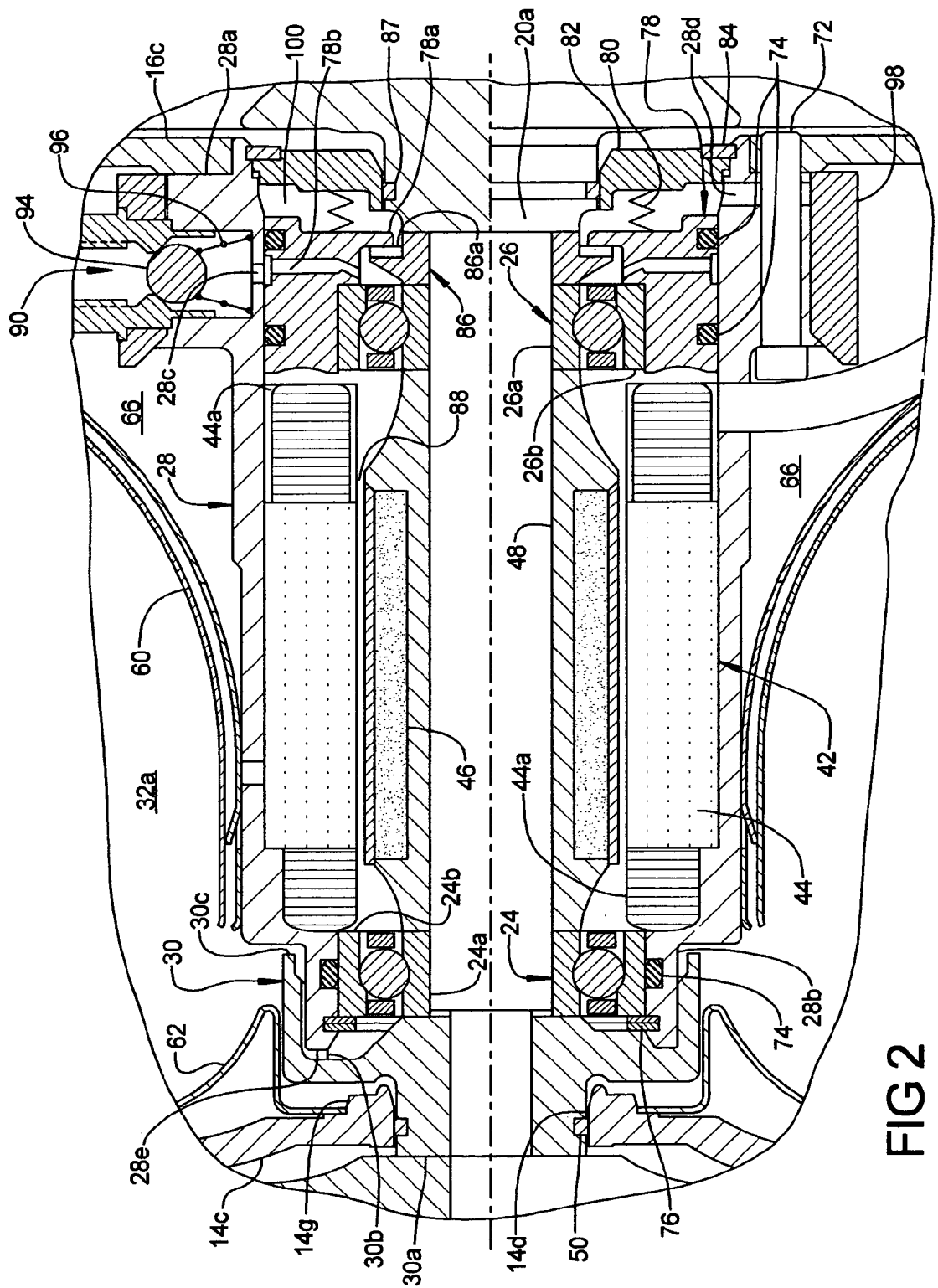
FIG. 2 is an enlarged central portion of the engine in FIG. 1.

Referring now to the drawings, therein is illustrated a longitudinal cross-sectional view of a small gas turbine engine 10 including an outer wall 12 defined by a cylindrical member, an air flow directing means or inlet diffuser 14, a combustor exhaust flow directing means or turbine nozzle 16, an air inlet impeller or centrifugal flow compressor 18, an exhaust impeller or turbine 20 which may be of the mixed flow type as illustrated herein having axial and centripetal flow (i.e., flow that is initially radially inward and axial), a shaft 22 having an axis 22a, a bearing assembly including bearings 24,26, a bearing support tube 28, a fuel slinger 30, an annular combustion chamber 32 concentric to the shaft and axially interposed between the compressor and turbine, and compressor and turbine shrouds 34,36. Outer wall 12 has an outer surface 12a defining the outside diameter of the engine, an inner surface 12b, a forward or air inlet end 12c, and a rearward or exhaust end 12d. The outer surface has a combustion chamber source of ignition 37, fuel/air connector assembly 38 and an electrical connector 40 secured thereto. A horizontal cross-section of assembly 38 is shown in FIG. 3 connected to a schematically shown source of metered fuel 39 via a schematically shown fuel line 41. Assembly 38 also connects compressor discharge air to a fuel reservoir 43 via an airline 45 explained further hereinafter. Fuel/air connector assembly 38 may be comprised of separate components and the compressor discharge air may be ported to other components. The reservoir is connected to the source of metered fuel via a line 47. Alternatively, the outer surface may define a smooth maximum outside diameter of the engine with the fuel inlet and electrical connector mounted in a manner analogous to the fuel inlet in previously mentioned U.S. Pat. No. 5,526,640.

An electrical generator 42 is disposed in the engine concentric to shaft 22 and radially inward of the annular combustion chamber 32. The generator includes a stator assembly 44 fixed within support tube 28 and an armature rotor 46 with permanent magnets formed with a rotor member 48 affixed to shaft 22. Fuel accumulation between the stator windings and surrounding structure is prevented by a potting material 44a. An annular sleeve 49 holds the permanent magnets in place against the high speed of shaft 22 which may be in the range of 140,000 revolutions per minute. Outer wall 12, diffuser 14, nozzle 16, bearing support tube 28, stator assembly 44 and shrouds 34, 36 are non-rotating components defining the engine's main non-rotating structure. Turbine 20 includes an axially extending hub portion 20a friction welded at its forward face to shaft 22. A wrench fitting head 20b is formed with the turbine for holding the turbine and shaft when a nut 51 at the compressor end of the shaft is turned. Compressor 18, turbine 20, shaft 22, rotor 46, scavenge pump 86 and slinger 30 are rigidly secured together by nut 51, and define a rotating assembly supported by bearings 24,26 in support tube 28.

Diffuser 14 and nozzle 16 respectively include a plurality of circumferentially spaced apart guide vanes 14a,16a secured together by a first support or outer portion 14b, 16b and a second support or inner portion 14c,16c. Diffuser inner portion 14c includes a central opening 14d rotatably receiving a hub portion 30a of fuel slinger 30. A ring seal 50 disposed in a groove in the hub portion seals the rotating interface between the central opening and hub portion. The diffuser and nozzle may be manufactured in many different ways. For example, they may be manufactured as an assembly of separate guide vanes and supports as in previously mentioned U.S. Pat. No. 5,526,640 or, as herein, they may each be cast as integral assemblies.

Outer wall 12 is secured to diffuser 14 by an attachment assembly including internal threads 12e formed on an inner annular surface of wall 12 and threadably received by external threads 14e formed on an outer annular surface of diffuser outer portion 14b. Compressor shroud 34 is secured to diffuser 14 by an attachment assembly including external threads 34a formed on an outer annular surface of the shroud and threadably received in internal threads 14f formed on an inner annular surface of the diffuser until a shoulder 34b contacts a front face of diffuser outer portion 14b. Exhaust end 12d of the outer wall, turbine shroud 36 and an exhaust cone 52 are secured to nozzle 16 by a plurality of screws 54 threadably received in an annular extension 16e of nozzle outer portion 16b.

Compressor 18 includes a body portion 18a having a bore 18b tightly receiving shaft 22, a plurality of circumferentially spaced apart fluid working blades 18c extending from the body portion. The blades have curvilinear shaped free ends 18d extending between air inlet and air outlet ends 18e, 18f of the blades. Compressor shroud 34 includes an inner curvilinear surface matching the curvilinear shaped free ends 18d of the compressor blades.

Annular combustion chamber 32 is bounded by a radially outer liner 56, a radially inner liner 58, a sub-liner 60 and an end liner 62 extending radially inward from and affixed to a forward or upstream end of the outer liner which is supported at a downstream end by nozzle inner portion 16c. Combustion chamber 32 includes a primary and secondary combustion zone 32a at a forward or upstream end of the chamber and a dilution combustion zone 32b. A radially inner portion of end liner 62 is supported on an annular shoulder 14g of the diffuser inner portion. Inner liner 58 is radially supported at its forward end by support tube 28 and is supported at its rear or exhaust end by nozzle inner portion 16c. Outer wall 12 and outer liner 56 define an outer air annulus 64 receiving compressor discharge air at its forward end from diffuser 14. Inner liner 58 and support tube 28 define an inner air annulus 66 receiving air from outer annulus 64 via a plurality of circumferentially spaced apart air tubes 68 each extending substantially radially between openings in outer and inner liners 56,58. Diffuser inner portion 14c and end liner 62 define a forward air annulus 70 receiving air from the outer annulus. Liners 56, 58, 62 include openings, apertures, louvers or the like for directing air to the primary and secondary combustion zones and to the dilution combustion zone. Sub-liner 60 provides a hot surface for combustion zone 32a while creating a passage directing airflow from inner annulus 66 to combustion zone 32a.

Bearing support tube 28 extends axially in cantilever fashion from a first end 28a thereof affixed to nozzle inner portion 16c by a plurality of screw fasteners 72. The other end 28b of support tube 28 extends to a position within fuel slinger 30. Shaft 22 is rotatably supported in the support tube by the axially spaced apart bearings 24,26 which herein are alike and of the antifriction ball type. The bearings may be of the angular contact type. Inner races 24a, 26a of the bearings are supported on shaft 22 and spaced apart by rotor member 48. Both bearing outer races 24b,26b are preferably but not necessarily supported on the interior of support tube 28 with radial resilience. Herein, rings of elastic material 74 provide the radial resilience. However, other materials may be used, e.g., resilient heat resistant materials. The outer race 24b is axially retained in the leftward or forward direction by a snap ring 76 received in an annular groove in the tube. The outer race 26b at support tube end 28a is carried by a ring 78 and is biased axially leftward by a schematically shown spring 80 sandwiched between the ring and a sleeve 82 axially retained in the rightward or rearward direction by a snap ring 84 received in an annular groove in the support tube. Spring 80 resiliently preloads the bearings and allows for thermal expansion of the shaft.

Turbine 20 includes hub portion 20a, wrench fitting 20b, a body portion 20c, and a plurality of circumferentially spaced apart fluid working blades 20d extending from the body portion. A forward portion of axially extending hub portion 20a is rotatably received in support tube end 28a. The blades have curvilinear shaped free ends 20e extending between inlet and outlet ends 20f,20g of the blades. Turbine shroud 36 includes an inner curvilinear surface 36a matching the curvilinear shaped free ends 20e of the turbine blades.

A scavenge pump 86 is axially disposed between bearing 26 and turbine hub 20a. The pump includes radially extending pumping vanes 86a analogous to pumping vanes 30b in fuel slinger 30. The vanes may have a backward slope angle. Pumping efficiency of the vanes is improved by a flange 78a extending radially inward from ring 78 to a position closely spaced from the axial free ends of vanes 86a. A heat resistant seal 87 is disposed in a groove in the hub portion to seal the rotating interface between the hub portion and sleeve 82. The annular space/magnetic gap between the interior of stator assembly 44 and the outer diameter of rotor 46 defines an annular air/fuel flow path 88 for directing an air/fuel mixture to slinger 30, for lubricating and cooling bearings 24,26, for cooling the stator assembly 44 and for warming the air/fuel mixture to promote rapid combustion. Axial ends 48a of rotor member 48 streamlined to reduce turbulence of the air/fuel mixture flowing through path 88. Fuel is introduced to the air/fuel annulus via passages 28c in support tube 28, passages 78b in ring 78 and scavenge pump 86. Seals 74 prevent leakage between the interface of support tube 28 and ring 78. Opening 28c is connected via a check valve 90 to one end of a fuel line 92. A ball 94 in the check valve is biased against a seat by a schematically shown cone spring 96. The fuel line extends through one of air tubes 68 and is connected at its other end to the fuel/air connector assembly 38, which is fastened to a mounting pad 14g on outer surface 12a of outer wall 12. A schematically shown fuel reservoir 43 has a positive air pressure maintained on the fuel therein by compressor discharge air via a passage 12g, a port 38a, an unshown passage in fuel/air connector assembly 38 and an air line 45. Air from inner air annulus 66 is introduced to the annular air/fuel flow path 88 via a filter 98, openings 28d in tube 28 and an annular passage 100 between ring 78 and sleeve 82. The airflow in annular passage 100 also cools hub portion 20a. Fuel and air that enters flow path 88 is moved through the bearings and into the combustion chamber via the difference in compressor discharge and combustor pressures, scavenge pump 86 and slinger 30. The scavenge pump also improves mixing of the air/fuel mixture and prevents fuel accumulation in annular passage 100. In actual practice, one of the screw fasteners 72 does not pass through opening 28d. Slinger vanes 30b therein, pump the fuel mixture from air/fuel flow path 88 to an annular sleeve 30c, which slings the mixture radially outward into primary combustion zone 32a. The pumping efficiency of vanes 30b, like scavenge pump vanes 86a are improved by close axial spacing of an axially facing end 28e of support tube 28.

Positioning generator 42 concentrically around shaft 22 and radially inward of annular combustion chamber 32 does not increase the turbine engine length and/or overall size. In addition, engine manufacturing cost and assembly time and repair is reduced by thread attachment of inlet diffuser 14 to outer wall 12 and thread attachment of compressor shroud 34 to the inlet diffuser. After compressor shroud 34 and diffuser 14 are assembled by threading them together, a preferred running clearance between compressor blade free ends 18d and shroud matching surface 34c is easily obtained by rotating threads 14e into threads 12e until shroud matching surface 34c contacts blade free ends 18d and then reverse rotating the threads a predetermined amount based on the thread pitch. The threads may be locked by a screw 98 that enters one of a plurality of circumferentially spaced apart recesses in the outer annular surface of diffuser outer portion 14b. Alternatively, the threads may be locked in any of several ways, for example, by deforming the threads. An analogous threading arrangement may be used for design and assembly of turbine nozzle and turbine shroud.

An improved gas turbine engine has been disclosed. Many variations and modifications of the disclosed embodiment are believed to be within the spirit of the invention. The following claims are intended to cover the inventive portions of the disclosed embodiment and variations and modifications believed to be within the spirit of the invention.

What is claimed is:

1. A turbine machine comprising:
a housing having an annular surface;
a shaft having an axis;
a bearing assembly mounting the shaft for rotation and non-axial movement in the housing about the axis;
annular radial fluid flow impeller means including a body portion concentrically affixed to the shaft and a plurality of circumferentially spaced apart fluid working blades extending from the body, the blades having curvilinear shaped free ends extending between fluid inlet and outlet ends of the blades, one of the blade ends being axial fluid flow ends and the other of the blade ends being radial fluid flow ends;
a radial flow directing means for radially directing the fluid associated with the radial fluid flow blade ends and having an annular surface;
a shroud includes an annular surface and an inner surface having a curvilinear shaped surface in closely spaced sealing relation with and matching the blade curvilinear shaped free ends;
a first attachment assembly for affixing the flow directing means to the housing;
a second attachment assembly for affixing the shroud to the flow directing means;
the improvement comprising:
the first attachment assembly including screw threads on the housing annular surface and mating with screw threads on the flow directing means annular surface for adjustably affixing the flow directing means to the housing and for clearance adjusting the closely spaced sealing relation by rotating the attachment assembly screw threads relative to each other.

2. The turbine machine of claim 1, further comprising:
the flow directing means is a diffuser; and
the shroud includes an annular surface;
the second attachment assembly includes screw threads on the shroud annular surface and mating with screw threads on a second annular surface of the diffuser for affixing the flow directing means to the shroud.

3. The turbine machine of claim 2, further comprising:
an annular combustor disposed in the housing concentric to the shaft; and
the flow directing means for directing the fluid between the impeller and the combustor.

4. The turbine machine of claim 3, wherein:
the radial fluid flow impeller means is a compressor and the blade outlet ends discharge the fluid in the form of compressor discharge air to the diffuser.

5. The turbine machine of claim 4, further including:
a turbine nozzle axially spaced from the diffuser with the combustor axially disposed there-between;
a turbine affixed to the shaft and axially spaced from the compressor; and
an electric generator having a stator mounted axially between the diffuser and the nozzle, radially inward of the annular combustor and concentric to the shaft, and a rotor affixed to the shaft radially inward of the stator.

6. The turbine machine of claim 5, further including:
a fuel slinger affixed to the shaft and positioned to discharge a fuel to the annular combustor;
the bearing assembly including a support tube concentric to the shaft and affixed rigidly relative to the housing between the compressor and turbine, the tube having a first end positioned adjacent the turbine and a second end positioned adjacent the slinger, first and second axially spaced apart bearings respectively associated with the tube second and first ends and supporting the shaft on interior portions of the support tube;
the generator stator affixed to an interior portion of the support tube axially between the first and second bearings;
an air/fuel annulus defined between the stator and the rotor and providing a flow path for supplying an air/fuel mixture to the slinger, for cooling the stator, for lubricating and cooling the bearings and for warming the air/fuel mixture to improve combustion; and air/fuel delivery means supplying the air/fuel mixture to the air/fuel annulus at a position axially interposed between the support tube first end and the first bearing.

7. The turbine machine of claim 6, further including:
a fuel/air connector assembly for connecting the fuel delivery means to a source of metered fuel and for connecting the compressor discharge air to components requiring a positive pressure.

8. The turbine machine of claim 7, further including:
a fuel reservoir connected to the compressor discharge air for maintaining a positive pressure on fuel in the reservoir.

9. The turbine machine of claim 6, wherein:
the support tube is affixed to the turbine nozzle and extends axially therefrom in cantilever fashion.

10. A gas turbine engine comprising:
an annular housing means;
a shaft having an axis;
a bearing assembly mounting the shaft for rotation and non-axial movement in the housing about the axis;
a annular combustor disposed in the housing means concentric to the shaft;
a radial fluid flow impeller means including an annular body portion concentrically affixed to the shaft and a plurality circumferentially spaced apart fluid working blades extending from the body portion, the blades having curvilinear shaped free ends extending between inlet ends and outlet ends of the blades;
a flow directing means for directing the fluid between the impeller and the combustor;
a shroud means including an inner surface having a curvilinear shaped surface in closely spaced sealing relation with and matching the curvilinear shaped free ends of the blades;
a first attachment assembly for affixing the flow directing means to the housing means;
a second attachment assembly for affixing the shroud to the flow directing means; the improvement comprising:
one of the attachment assemblies including internal screw threads on a radially inwardly facing annular surface of one of the means and mating with external screw threads on a radially outwardly facing annular surface of another of the means for clearance adjusting the spaced sealing relation between the blade curvilinear shaped free ends and matching shroud curvilinear shaped surface by moving the threads relative to each other.

11. The turbine engine of claim 10, wherein:
the flow directing means is an air inlet diffuser;
first attachment assembly includes the radially inwardly facing annular surface and the internal screw threads formed on the housing means and includes the radially outwardly facing surface having the external threads formed on the air inlet diffuser;
shroud means is an air inlet shroud;
second attachment assembly includes the radially inwardly facing annular surface and the internal screw threads formed on the air inlet diffuser and includes the radially outwardly facing surface having the external threads formed on the air inlet shroud;
the impeller is a compressor and the blade outlet ends discharge the fluid to the air inlet diffuser.

12. The turbine engine of claim 11, further including:
a turbine nozzle axially spaced from the diffuser with the combustor axially disposed there-between;
a turbine affixed to the shaft and axially spaced from the compressor; and an electric generator having a stator mounted axially between the diffuser and the nozzle, radially inward of the annular combustor and concentric to the shaft, and a rotor affixed to the shaft radially inward of the stator.

13. The turbine engine of claim 12, further including:
a fuel slinger affixed to the shaft and positioned to discharge a fuel to the annular combustor;
the bearing assembly including a support tube concentric to the shaft and affixed rigidly relative to the housing between the compressor and turbine, the tube having a first end positioned adjacent the turbine and a second end positioned adjacent the slinger, first and second axially spaced apart bearings respectively associated with the tube second and first ends and supporting the shaft on interior portions of the support tube;
the generator stator affixed to an interior portion of the support tube axially between the first and second bearings;
an air/fuel annulus defined between the stator and the rotor and providing a flow path for supplying an air/fuel mixture to the slinger, for cooling the stator, for lubricating and cooling the bearings and for warming the air/fuel mixture to improve combustion; and
air/fuel delivery means supplying the air/fuel mixture to the air/fuel annulus at a position axially interposed between the support tube first end and the first bearing.

14. The turbine machine of claim 13, further including:
a fuel/air connector assembly for connecting the fuel delivery means to a source of metered fuel and for connecting the compressor discharge air to components requiring a positive pressure.

15. The turbine machine of claim 14, further including:
a fuel reservoir connected to the compressor discharge air for maintaining a positive pressure on fuel in the reservoir.

16. The turbine engine of claim 13, wherein:
the support tube is affixed to the turbine nozzle and extends axially therefrom in cantilever fashion.

17. A gas turbine engine comprising:
an annular housing;
a shaft having an axis;
a bearing assembly mounting the shaft for rotation and non-axial movement in the housing about the axis;
an annular combustor disposed in the annular housing means concentric to the shaft;
a radial flow compressor affixed to the shaft;
a diffuser for directing compressor discharge air from the compressor to the annular combustor;
a radial flow turbine nozzle axially spaced from the diffuser with the combustor axially disposed there-between;
a radial flow turbine affixed to the shaft and axially spaced from the compressor; the improvement comprising:
an electric generator having a stator mounted axially between the diffuser and the nozzle, radially inward of the annular combustor and concentric to the shaft, and a rotor affixed to the shaft radially inward of the stator.

18. The turbine machine of claim 17, further including:
a fuel slinger affixed to the shaft and positioned to discharge a fuel to the annular combustor;
the bearing assembly including a support tube concentric to the shaft and affixed rigidly relative to the housing between the compressor and turbine, the tube having a first end positioned adjacent the turbine and a second end positioned adjacent the slinger, first and second axially spaced apart bearings respectively associated with the tube second and first ends and supporting the shaft on interior portions of the support tube; and the generator stator affixed to an interior portion of the support tube axially between the first and second bearings.

19. The turbine machine of claim 18, further including:

an air/fuel annulus defined between the stator and the rotor and providing a flow path for supplying an air/fuel mixture to the slinger, for cooling the stator, for lubricating and cooling the bearings and for warming the air/fuel mixture to improve combustion; and air/fuel delivery means supplying the air/fuel mixture to the air/fuel annulus at a position axially interposed between the support tube first end and the first bearing.

20. The turbine machine of claim 19, further including:

a fuel/air connector assembly for connecting the fuel delivery means to a source of metered fuel and for connecting the compressor discharge air to components requiring a positive pressure.

21. The turbine machine of claim 20, further including:

a fuel reservoir connected to the compressor discharge air for maintaining a positive pressure on fuel in the reservoir.

22. The turbine machine of claim 19, wherein:

the support tube is affixed to the turbine nozzle and extends axially therefrom in cantilever fashion.

\* \* \* \* \*